United States Patent
Tsai et al.

(10) Patent No.: US 8,346,385 B2
(45) Date of Patent: Jan. 1, 2013

(54) EARLY-WARNING APPARATUS FOR HEALTH DETECTION OF SERVO MOTOR AND METHOD FOR OPERATING THE SAME

(75) Inventors: Ching-Shiong Tsai, Taipei (TW); Meng-Chang Lin, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 277 days.

(21) Appl. No.: 12/814,791

(22) Filed: Jun. 14, 2010

(65) Prior Publication Data
US 2011/0307093 A1 Dec. 15, 2011

(51) Int. Cl.
*G06F 19/00* (2011.01)
(52) U.S. Cl. .................. 700/177; 700/195
(58) Field of Classification Search .......... 700/174, 700/175, 177–178, 195, 280; 318/128, 400.23, 318/460; 708/404
See application file for complete search history.

(56) References Cited

U.S. PATENT DOCUMENTS

| | | | | |
|---|---|---|---|---|
| 5,854,994 | A * | 12/1998 | Canada et al. | 702/56 |
| 7,308,322 | B1 * | 12/2007 | Discenzo et al. | 700/28 |
| 7,346,461 | B2 * | 3/2008 | Huang et al. | 702/56 |
| 2006/0192508 | A1 * | 8/2006 | Albers | 318/128 |

* cited by examiner

*Primary Examiner* — Sean Shechtman
(74) *Attorney, Agent, or Firm* — Muncy, Geissler, Olds & Lowe, PLLC

(57) ABSTRACT

An early-warning apparatus for health detection of a servo motor and a method for operating the same are applied to estimate vibration phenomenon of a CNC tool machine. First, a vibration signal is produced through a vibration detecting unit. Afterward, the vibration signal is sequentially sent to a data buffer. Afterward, the vibration signal is transformed in time and frequency domains through a time-frequency transforming unit. Finally, a deterioration index is calculated through a deterioration index calculating unit to obtain a health index which is calculated through a health index calculating unit. Therefore, the build-in vibration detecting unit is provided to dispense with additional external sensors. Furthermore, the vibration phenomenon of the servo motor of the CNC tool machine is estimated according to the health index, thus analyzing non-linear and non-stationary characteristics of the estimated vibration phenomenon.

14 Claims, 7 Drawing Sheets

EARLY-WARNING APPARATUS FOR HEALTH DETECTION OF SERVO MOTOR AND METHOD FOR OPERATING THE SAME

BACKGROUND OF THE INVENTION

1. Field of the Invention

The present invention relates to an early-warning apparatus for health detection of a servo motor and a method for operating the same, and more particularly to an early-warning apparatus for health detection of the servo motor and the method for operating the same for analyzing a vibration signal which is transformed in time and frequency domains.

2. Description of Prior Art

With the advancement of the high-efficient and high-quality production technologies, the machinery equipment will overall be developed toward the trend of large scale, high speed, systematization, complication, and automation. Thus, the correlation between every individual system is highly dependent with the large and complicated machinery equipment. However, if the hidden faults of the machinery equipment do not be detected before actually occurring in the future, the economical losses will be considerable.

The application of the CNC tool machine is exemplified for further demonstration. An upper controller is provided to send position commands to a multi-shaft servo driver to drive servo motors. A work table is moved through a transmission system (including screw rods, slide rails, and so on) of the CNC tool machine. However, the problems such as machine and lubrication consumption would influence smoothness of the work table because of using the CNC tool machine for a long time. Thus, irregular vibration and energy consumption of the machine table are unavoidable. When the abnormal vibration exists in the machinery equipment, the machinery equipment would be normally operated during a short time but the machinery equipment will be inevitably damaged for a long time operation.

For estimating the health of the servo motors by a systematic operation, the PC-based schemes are usually adopted. The calculators collect the data of voltage, current, and losses, and the vibration data sent from accelerometers of the machine table. These time-domain data can be transformed into frequency-domain or time-and-frequency-domain data by using a fast Fourier transform (FFT) or a wavelet transform (WT). Although the health index can be calculated by statistical methods and model learning, multiple stand-alone calculators have to be used because of large amount of computation. Thus, the total equipment costs and the required space will increase due to the additional amount of calculators. In addition, the different functions of the drivers provided by different brands (even different types) would limit the uniformity and reality of the captured signals.

The researches of failure diagnosis of rotating machinery have been developed for many years. So far the fast Fourier transform (FFT), which is provided to process signals and analyze data, is most commonly used in estimating the vibration signals, and more particularly in the frequency-domain analysis. Traditional Fourier spectral analysis conveniently provides energy distribution of processed signals in the frequency domain by linearly superimposing the processed signals, which are composed of sine and cosine functions with different frequencies, magnitudes, and phases. Thus, the signal features can be inherently represented in the frequency domain by the Fourier spectral analysis for processing linear and stationary signals, while that are difficult to analyze in the time domain.

However, for analyzing the non-linear and non-stationary signals, the Fourier spectral analysis has the following disadvantages:

1. During the integration process, however, some messages of the processed signals would be easily erased. Besides, the spectrum illusions will result in incorrect spectrum, thus making mistakes of estimating the processed signals.

2. The time-domain information of the signals will disappear when the time-domain signals are transformed into the frequency-domain signals. That is, it is not available to confirm the occurrence time of the specific frequency spectrum in the frequency domain.

The wavelet transform (WT) can be also provided to analyze signals in three-dimensional components (including time, frequency, and magnitude components). A composite signal with different frequencies can be decomposed into a number of signals with corresponding independent frequencies, thus effectively separating the signal and the noise among the composite signal. Because the wavelet transform, however, is derived from the Fourier spectral analysis, it inherently has the energy-distributing, bandwidth-rising, and adaptability-lacing disadvantages. In addition, a number of basis functions have to be selected before analyzing all of the data of the processed signals, thus it will limit applicable scopes.

Accordingly, it is desirable to provide an early-warning apparatus for health detection of a servo motor and a method for operating the same to dispense with additional external sensors; and further estimate the vibration phenomenon of the servo motor of the CNC tool machine and analyze non-linear and non-stationary characteristics of the estimated vibration phenomenon.

SUMMARY OF THE INVENTION

In order to solve the above-mentioned problems, the present invention provides an early-warning apparatus for health detection of a servo motor, and the early-warning apparatus is applied to estimate vibration phenomenon of a CNC tool machine.

The early-warning apparatus includes a servo motor and a servo driver. The servo motor has a build-in vibration detecting unit for detecting operational parameters of the servo motor and producing a vibration signal.

The servo driver is connected to the servo motor and has a microcontroller. The microcontroller has a time-frequency transforming unit, an analyzing unit, a deterioration index calculating unit, and a health index calculating unit. The time-frequency transforming unit receives the vibration signal to transform the vibration signal in time and frequency domains. The analyzing unit is connected to the time-frequency transforming unit to receive the vibration signal and analyze the vibration signal into a plurality of decomposed signals. The deterioration index calculating unit is connected to the analyzing unit to calculate a deterioration index according to the comparison of the decomposed signals with an evaluation curve. The health index calculating unit is connected to the deterioration index calculating unit to calculate a health index according to the deterioration index.

Therefore, the build-in vibration detecting unit is provided to dispense with additional external sensors and estimate the vibration phenomenon of the servo motor of the CNC tool machine according to the health index, thus analyzing non-linear and non-stationary characteristics of the estimated vibration phenomenon.

In order to solve the above-mentioned, the present invention provides an early-warning method for health detection of a servo motor, and the early-warning method is applied to estimate vibration phenomenon of a CNC tool machine.

Steps of the early-warning method are described as follows: First, a vibration detecting unit is provided to produce a vibration signal. Afterward, the vibration signal is sent sequentially to a data buffer. Afterward, a time-frequency transforming unit is provided to transform the vibration signal in time and frequency domains. Finally, a deterioration index calculating unit is provided to calculate a deterioration index to obtain a health index which is calculated through a health index calculating unit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1A:
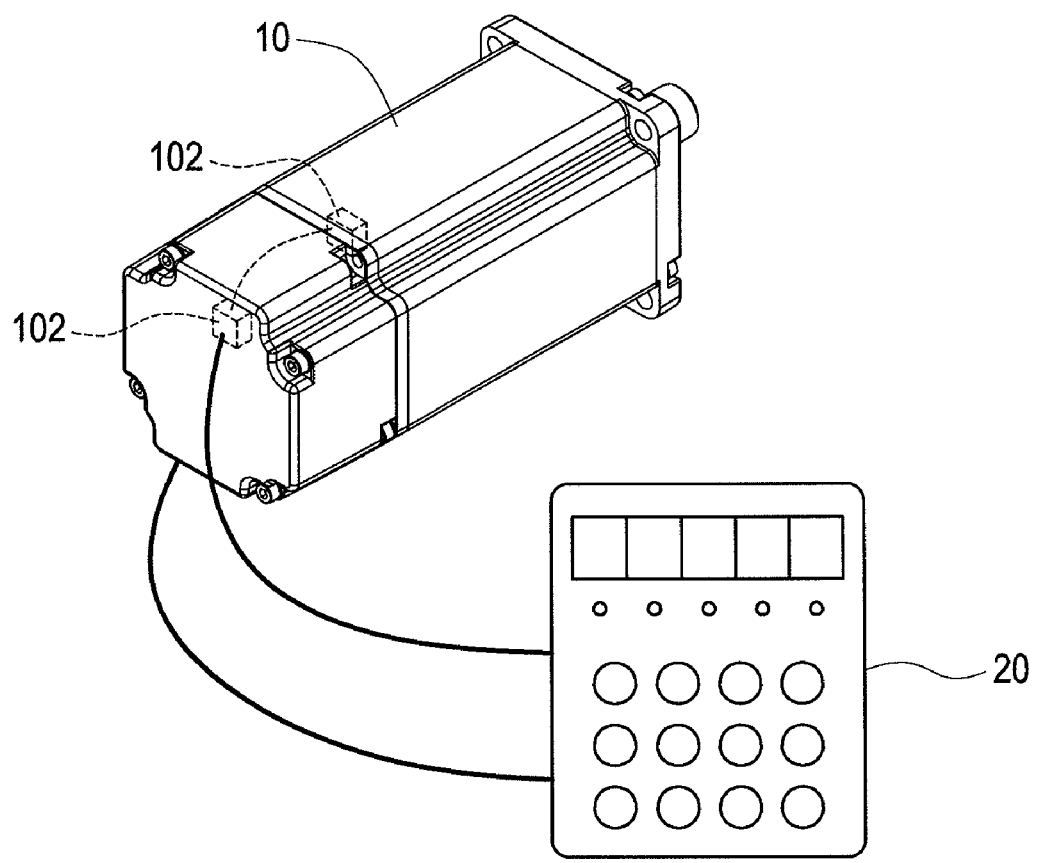
FIG. 1A is a schematic view of a connection between a servo motor and a servo driver according to the present invention.

Reference will now be made to the drawing figures to describe the present invention in detail.

Figure 1B:
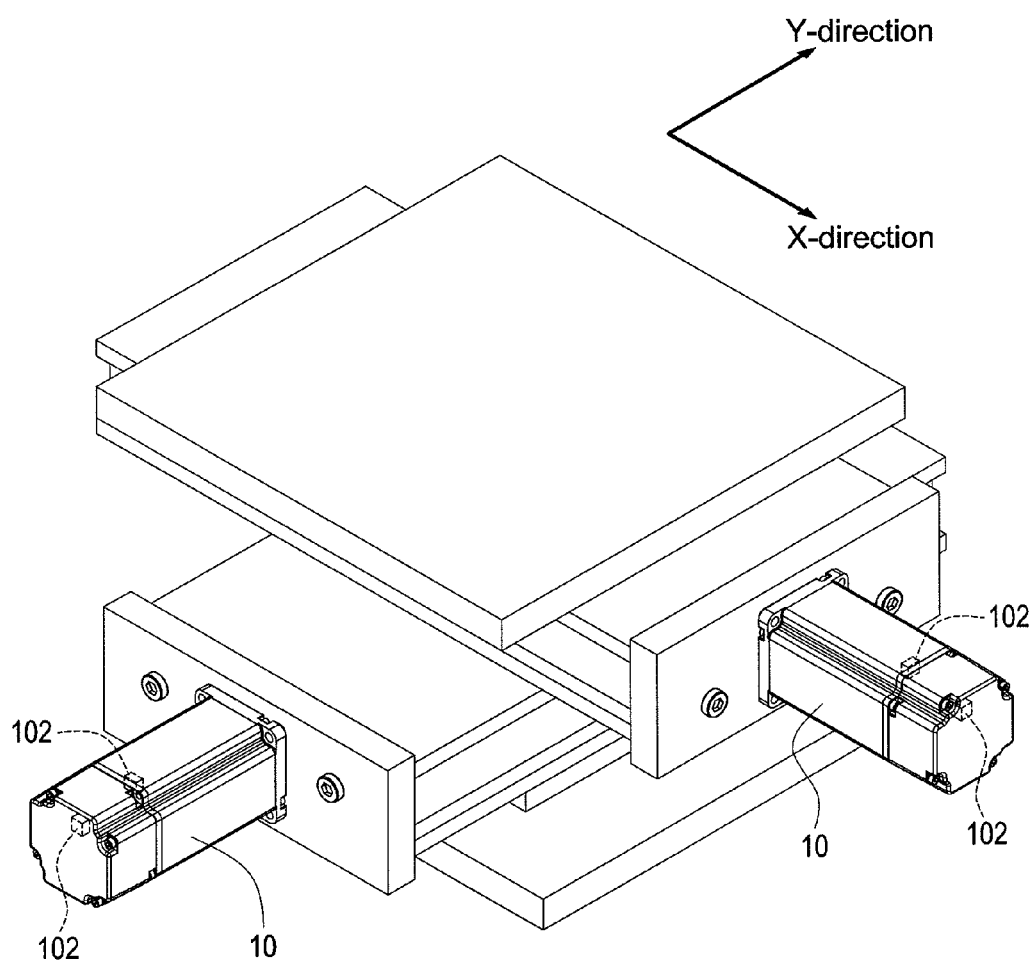
FIG. 1B is a perspective view of applying the servo motor to a CNC tool machine.

Reference is made to FIG. 1A and FIG. 1B which are a schematic view of a connection between a servo motor and a servo driver according to the present invention and a perspective view of applying the servo motor to a CNC tool machine, respectively. The control of angle location of the CNC tool machine is exemplified for further demonstration. An encoder is required in a rotation motor to detect the rotor angle, thus estimating the angular velocity and angular acceleration of the motor. In practical application, the rotor of the motor is usually driven directly or is driven through a coupler. The shaft-direction (namely, the Z-direction) vibration could be mostly delivered to the coupler, whereas the X-Y-direction vibration could be mostly delivered to the encoder. Thus, a vibration detecting unit 102 is installed in the encoder of the servo motor 10, and particularly the vibration detecting unit 102 is a G-sensor. The vibration detecting unit 102 can detect the vibrations and noises of the operated servo motor 10, screw rods, slide rails, and a work table. In addition, another vibration detecting unit 102 is installed in the stator slot of the servo motor 10. Because the servo motor 10 is locked by screws on a machine table, the detailed and accurate vibration phenomenon of the machine table can be detected by the vibration detecting unit 102 installed in the stator slot. That is, the vibration detecting unit 102 installed in the encoder is provided to estimate vibration phenomenon of the transmission system of the CNC tool machine. Furthermore, the vibration detecting unit 102 installed in a stator slot is provided to estimate vibration phenomenon of a machine table of the CNC tool machine.

Figure 2:
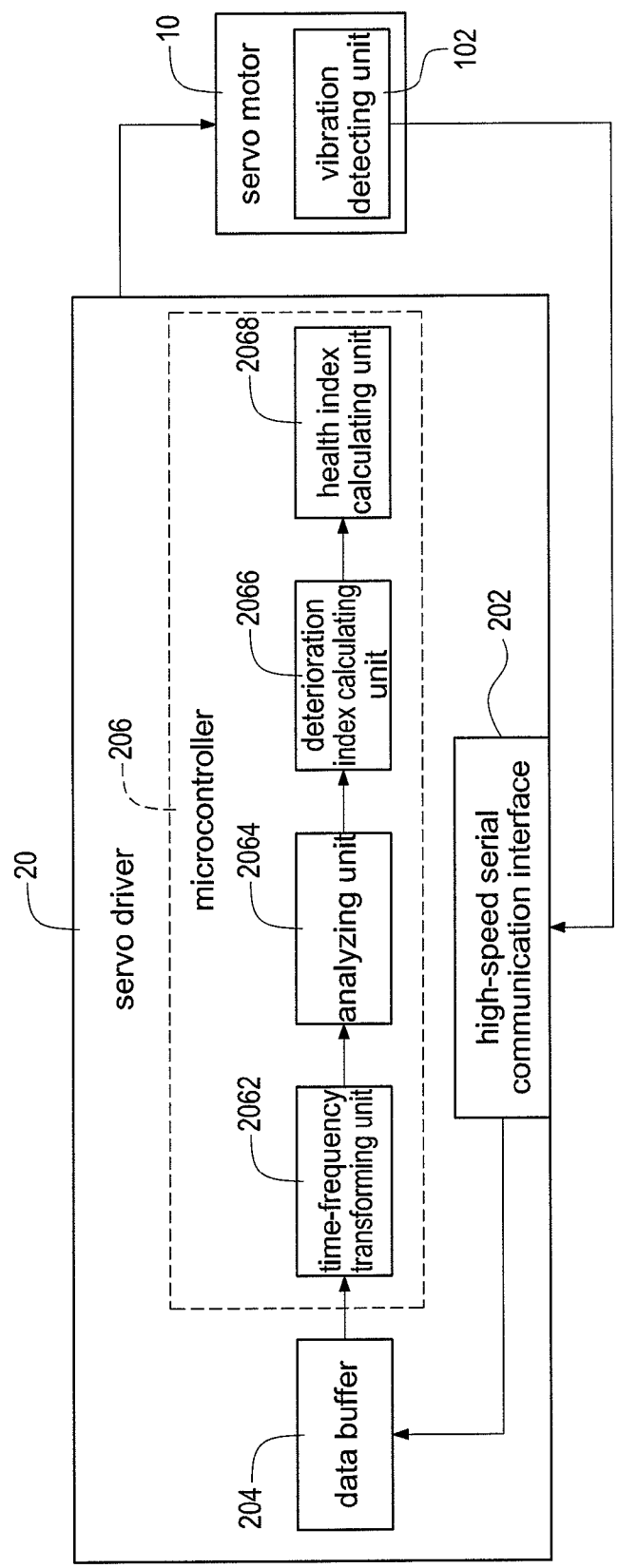
FIG. 2 is a circuit diagram of a connection between the servo motor and the servo driver.

Reference is made to FIG. 2 which is a circuit diagram of a connection between the servo motor and the servo driver. A servo driving system of the CNC tool machine mainly includes a servo motor 10 and a servo driver 20. The servo motor 10 mainly includes a rotor (not shown), a stator (not shown), an encoder (not shown) which is installed on the rotor, and at least one vibration detecting unit 102. More particularly, the vibration detecting unit 102 can be installed in the encoder of the servo motor 10 to estimate vibration phenomenon of a transmission system of the CNC tool machine. Alternatively, the vibration detecting unit 102 can be installed in the stator slot of the servo motor 10 to estimate vibration phenomenon of a machine table of the CNC tool machine.

In practical applications, multiple vibration detecting units 102 can be simultaneously installed (built-in) in the encoder and the stator slot to detect the X-direction, Y-direction, and Z-direction of the transmission system and the machine table, respectively. For convenience, one vibration detecting unit 102 is exemplified to further demonstrate the example. The vibration detecting unit 102 detects operational parameters of the servo motor 10 and produces a vibration signal Sv. The servo driver 20 is connected to the servo motor 10. The servo driver 20 includes a high-speed serial communication interface 202, a data buffer 204, and a microcontroller 206. The data buffer 204 is connected to the high-speed serial communication interface 202 to receive and store the vibration signal Sv. More particularly, the data buffer 204 is a queue buffer.

Figure 5A:
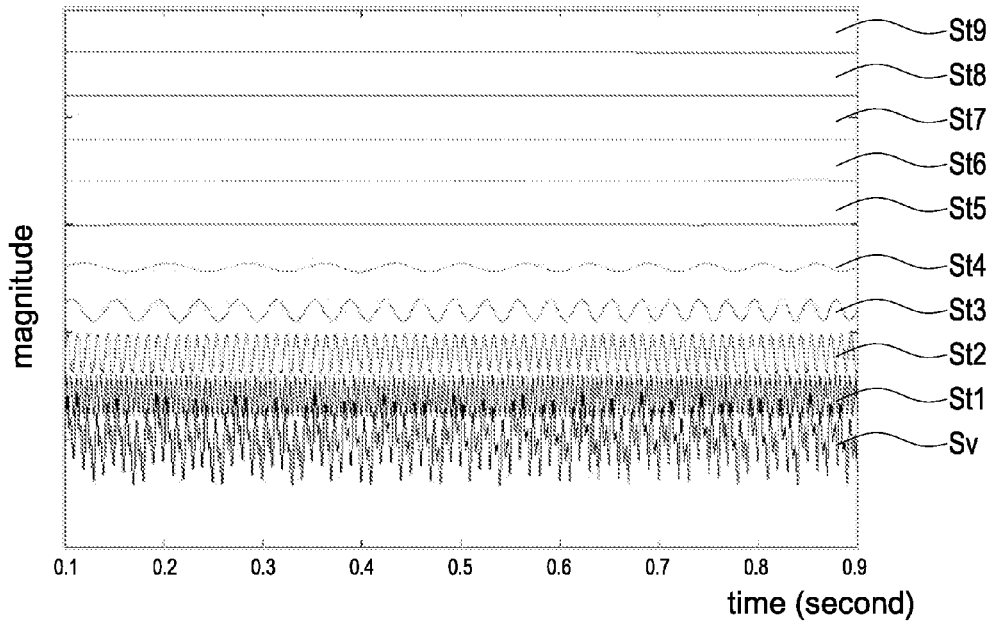
FIG. 5A is a waveform chart of an original time-domain vibration signal and a plurality of time-domain decomposed signals.

The microcontroller 206 is connected to the data buffer 204. The microcontroller 206 includes a time-frequency transforming unit 2062, an analyzing unit 2064, a deterioration index calculating unit 2066, and a health index calculating unit 2068. The time-frequency transforming unit 2062 receives the vibration signal Sv outputted from the data buffer 204 and transforms the vibration signal Sv in time and frequency domains. The analyzing unit 2064 is connected to the time-frequency transforming unit 2062 to receive the vibration signal Sv and analyze the vibration signal Sv into a plurality of time-domain decomposed signals St1~St9 (as shown in FIG. 5A). The deterioration index calculating unit 2066 is connected to the analyzing unit 2064 to calculate a deterioration index according to the comparison of the time-domain decomposed signals St1~St9 with an evaluation curve. More particularly, the evaluation curve is obtained through an empirical rule. The health index calculating unit 2068 is connected to the deterioration index calculating unit 2066 to calculate a health index according to the deterioration index. The detailed description of calculating the deterioration index and the health index will be made hereinafter. Therefore, the vibration phenomenon of the servo motor 10 of the CNC tool machine is estimated according to the health index.

Figure 3:
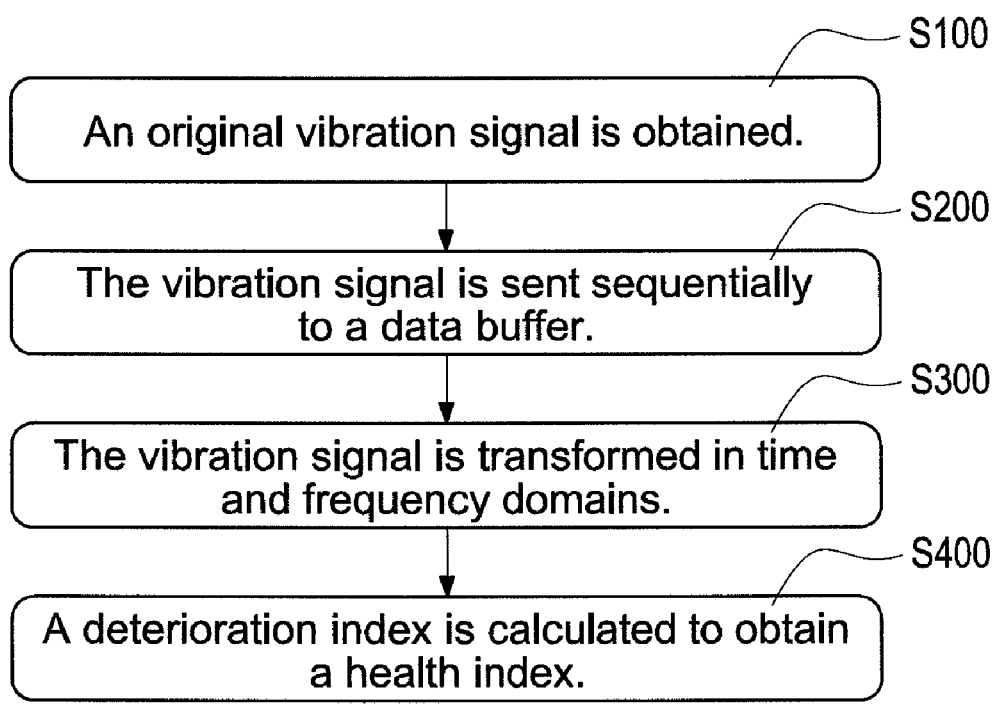
FIG. 3 is a flowchart of an early-warning method for health detection of a servo motor.

Reference is made to FIG. 3 which is a flowchart of an early-warning method for health detection of a servo motor. Steps of the early-warning method are described as follows: First, an original vibration signal is obtained (S100). Afterward, the vibration signal is sent sequentially to a data buffer (S200). Afterward, the vibration signal is transformed in time and frequency domains (S300). More particularly, the technology of transforming the vibration signal in time and frequency domains can be executed by the Hilbert-Hung transform (HHT), the fast Fourier transform, the wavelet transform, or other transform technologies. Finally, a deterioration index is calculated to obtain a health index (S400). The detailed description of the early-warning method will be made hereinafter.

Figure 4:
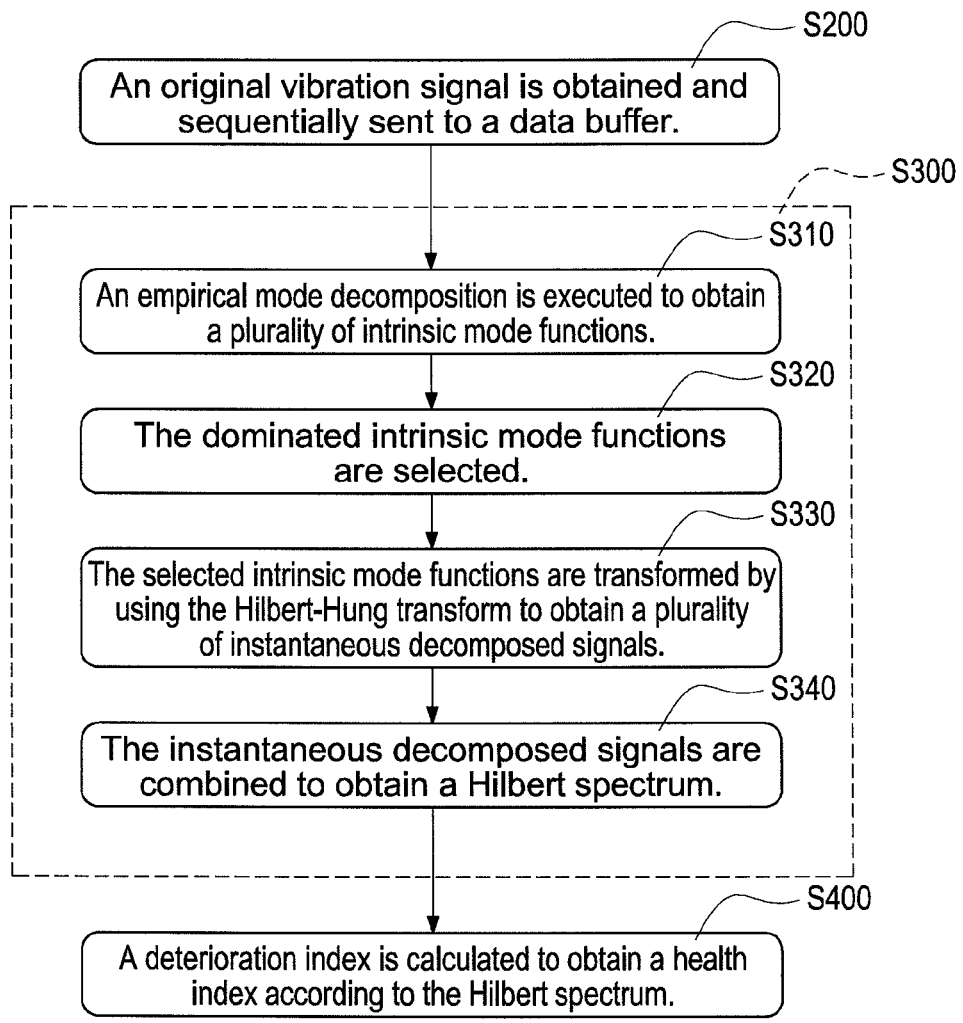
FIG. 4 is a flowchart of transforming a vibration signal in time and frequency domains.

Reference is made to FIG. 4 which is a flowchart of transforming a vibration signal in time and frequency domains. In this example, the Hilbert-Hung transform (HHT) is exemplified for detailed demonstration of the step (S300), that is, the vibration signal is transformed in time and frequency domains (S300). An empirical mode decomposition is executed to obtain a plurality of intrinsic mode functions (IMF) (S310) when the vibration signals are read out from the data buffer. Afterward, the dominated intrinsic mode functions are selected (S320), and the selected intrinsic mode functions are transformed by using the Hilbert-Hung transform to obtain a plurality of instantaneous decomposed signals (S330). Finally, the instantaneous decomposed signals are combined to obtain a Hilbert spectrum (S340). More particularly, the Hilbert spectrum is a three-dimensional graphical representation with time, frequency, and magnitude components. Also, the Hilbert spectrum is provided to represent the variations of frequency spectrum of the signals in the time domain, so that the result is an energy distribution over time and frequency.

Figure 5B:
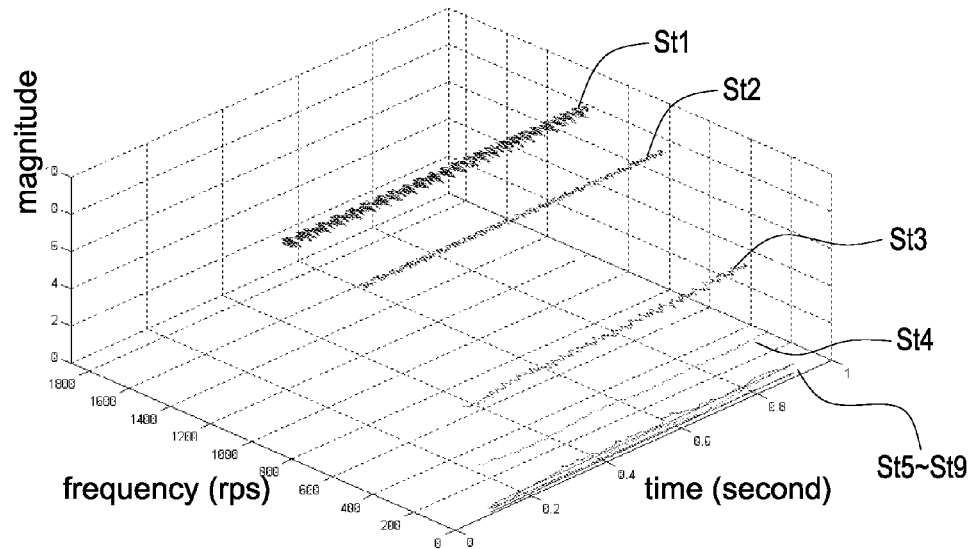
FIG. 5B is a three-dimensional graph with time, frequency, and magnitude components of the dime-domain decomposed signals.

Reference is made to FIG. 5A and FIG. 5B which are a waveform chart of an original time-domain vibration signal and a plurality of time-domain decomposed signals and a three-dimensional graph with time, frequency, and magnitude components of the dime-domain decomposed signals, respectively. As shown in FIG. 5A, an original time-domain vibration signal Sv can be analyzed into a plurality of time-domain decomposed signals St1~St9 by using the Hilbert-Hung transform (HHT). That is, the complicated time-domain vibration signal Sv can be analyzed into finite signals with different time scales. More particularly, the original time-domain vibration signal Sv can be reconstructed by superimposing the dominated time-domain decomposed signals St1~St9. In this example, a vibration detection of the servo motor 10 is exemplified for further demonstration with reference to FIG. 1B. It is assumed that the rotation speed of the servo motor 10 is $\omega(t)$. More particularly, the original time-domain vibration signal Sv and the transformed time-domain decomposed signals St1~St9 are shown from bottom to top in FIG. 5A. It is assumed that the frequency of the first time-domain decomposed signal St1 is 200 Hz, the frequency of the second time-domain decomposed signal St2 is 100 Hz, the frequency of the third time-domain decomposed signal St3 is twice of the $\omega(t)$, namely, $2\times\omega(t)$, and the frequency of the fourth time-domain decomposed signal St4 is $\omega(t)$. As shown in FIG. 5B, the three-dimensional graph with time, frequency, and magnitude components of the time-domain decomposed signals St1~St9 is corresponding to the Hilbert spectrum. Also, the different heights shown in FIG. 5B are corresponding to the energy magnitudes of the time-domain decomposed signals St1~St9.

Figure 6:
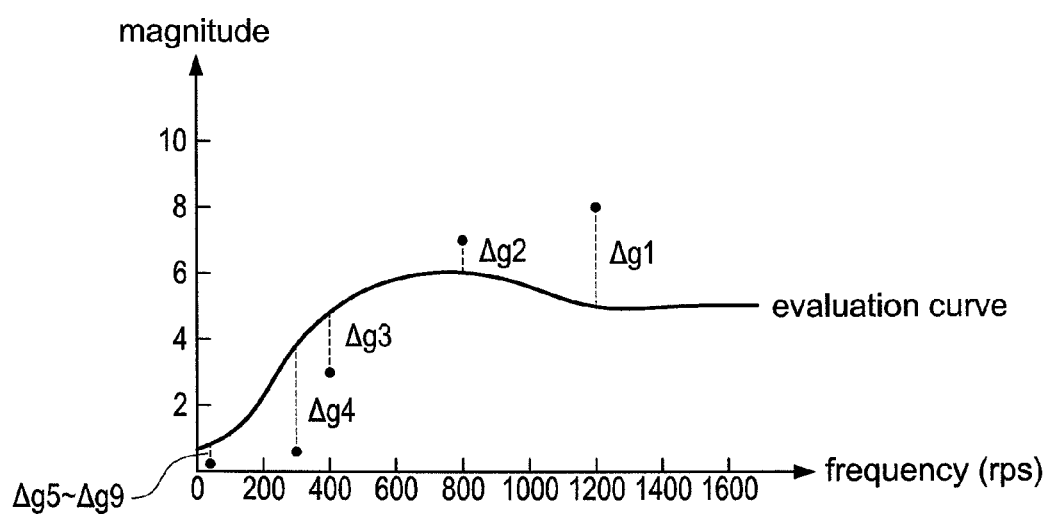
FIG. 6 is a schematic view of comparing the instantaneous decomposed signals to the evaluation curve.

Reference is made to FIG. 6 which is a schematic view of comparing the instantaneous decomposed signals to the evaluation curve. The magnitude of the time-domain decomposed signals St1~St9 cab be obtained at an instantaneous time from the Hilbert spectrum produced by the time-frequency transforming unit 2062. In this embodiment, there are nine instantaneous energy magnitudes, which are represented by black points, are obtained in this embodiment. Furthermore, the instantaneous energy magnitudes are compared to the evaluation curve to obtain nine corresponding energy differences $\Delta g1$~$\Delta g9$. That is, the energy differences $\Delta g1$~$\Delta g9$ are calculated by subtracting the energy values of the evaluation curve at the corresponding frequencies from the corresponding instantaneous energy magnitudes. Thus, the energy values of the evaluation curve would be considered as boundaries of evaluating health condition of the servo motor 10. We can significantly notice from FIG. 6 that the first energy difference $\Delta g1$ and the second energy difference $\Delta g2$ are positive. It indicates that the first time-domain decomposed signal St1 (at 1,200 rps) and the second time-domain decomposed signal St2 (at 800 rps) are in deterioration (abnormal) conditions with reference to the evaluation curve. In addition, the remaining energy differences $\Delta g3$~$\Delta g9$ are negative. Similarly, it indicates that the third time-domain decomposed signal St3 to the ninth time-domain decomposed signal St9 are in health (normal) conditions. More particularly, the deterioration degree of the servo motor 10 is quantified according to a deterioration index Di. Besides, a maximum permissible value Tm is introduced by applying an empirical rule. Thus, the deterioration index Di is calculated as follows:

$$Di=\Sigma(\text{positive values of the energy differences})/Tm.$$

That is, first, all positive values of the energy differences $\Delta g1$~$\Delta g9$ are summed up, and then the summed value is divided by the maximum permissible value Tm. In this example, the positive values of the energy differences are the first energy difference $\Delta g1$ and the second energy difference $\Delta g2$.

If the deterioration index Di is greater than 1, then Di=1 is considered. Furthermore, the health index Hi is calculated as follows:

$$Hi=1-Di.$$

Straightforwardly, the summed value of all positive values of the energy differences $\Delta g1$~$\Delta g9$ is larger when the deterioration degree of the servo motor 10 is more serious. Relatively, the health index Hi is smaller.

In conclusion, the present invention has following advantages:

1. The build-in vibration detecting unit is provided to dispense with additional external sensors.

2. Multiple vibration detecting units (G-sensors) are simultaneously installed (built-in) in the encoder and the stator slot to detect the X-direction, Y-direction, and Z-direction of the transmission system and the machine table, respectively.

3. The early-warning apparatus and method can provide different health indexes for estimating the multi-directional vibration phenomenon of the transmission system and the machine table, thus analyzing non-linear and non-stationary characteristics of the estimated vibration phenomenon.

Although the present invention has been described with reference to the preferred embodiment thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An early-warning apparatus for health detection of a servo motor is applied to estimate vibration phenomenon of a CNC tool machine; the early-warning apparatus comprising:
a servo motor having a built-in vibration detecting unit for detecting operational parameters of the servo motor and producing a vibration signal; and
a servo driver connected to the servo motor, comprising:
a microcontroller, comprising:
a time-frequency transforming unit receiving the vibration signal and transforming the vibration signal in time and frequency domains;
an analyzing unit connected to the time-frequency transforming unit and receiving the vibration signal and analyzing the vibration signal into a plurality of decomposed signals;
a deterioration index calculating unit connected to the analyzing unit and calculating a deterioration index according to a comparison between the decomposed signals and an evaluation curve; and
a health index calculating unit connected to the deterioration index calculating unit and calculating a health index according to the deterioration index;
whereby the built-in vibration detecting unit is provided to dispense with additional external sensors, and to estimate the vibration phenomenon of the servo motor of the CNC tool machine according to the health index, thus analyzing non-linear and non-stationary characteristics of the estimated vibration phenomenon.

2. The early-warning apparatus in claim 1, wherein the servo driver further comprises a high-speed serial communication interface to provide an interface for receiving the vibration signal.

3. The early-warning apparatus in claim 2, wherein the servo driver further comprises a data buffer which is connected to the high-speed serial communication interface and the microcontroller, thus receiving and storing the vibration signal produced from the vibration detecting unit.

4. The early-warning apparatus in claim 1, wherein the vibration detecting unit is installed in an encoder of the servo motor to estimate vibration phenomenon of a transmission system of the CNC tool machine.

5. The early-warning apparatus in claim 1, wherein the vibration detecting unit is installed in a stator slot of the servo motor to estimate vibration phenomenon of a machine table of the CNC tool machine.

6. The early-warning apparatus in claim 3, wherein the data buffer is a queue buffer.

7. The early-warning apparatus in claim 1, wherein the vibration detecting unit is a G-sensor.

8. The early-warning apparatus in claim 1, wherein the evaluation curve is obtained through an empirical rule.

9. The early-warning apparatus in claim 1, wherein the deterioration index is calculated by comparing the time-domain decomposed signals to the evaluation curve through the deterioration index calculating unit.

10. An early-warning method used for health detection of a servo motor and applied to estimate vibration phenomenon of a CNC tool machine; the early-warning method comprising the steps:
(a) detecting operational parameters of the servo motor, and producing a vibration signal through a vibration detecting unit;
(b) sending sequentially the vibration signal to a data buffer through a high-speed serial communication interface;
(c) transforming the vibration signal in time and frequency domains through a time-frequency transforming unit installed in a servo driver, and receiving the vibration signal and analyzing the vibration signal into a plurality of decomposed signals through an analyzing unit installed in the servo driver; and
(d) calculating a deterioration index through a deterioration index calculating unit installed in the servo driver by comparing the decomposed signals to an evaluation curve to obtain a health index which is calculated through a health index calculating unit.

11. The early-warning method in claim 10, the step (c) further comprising:
(c1) executing an empirical mode decomposition to obtain a plurality of intrinsic mode functions;
(c2) selecting the desired intrinsic mode functions;
(c3) transforming the selected intrinsic mode functions by using a Hilbert-Huang transform to obtain a plurality of instantaneous decomposed signals; and
(c4) combining the time-domain decomposed signals to obtain a Hilbert spectrum.

12. The early-warning method in claim 10, wherein the vibration signal is transformed in time and frequency domains by using a Hilbert-Huang transform (HHT).

13. The early-warning method in claim 10, wherein the vibration signal is transformed in time and frequency domains by using a fast Fourier transform (FFT).

14. The early-warning method in claim 10, wherein the vibration signal is transformed in time and frequency domains by using a wavelet transform (WT).

* * * * *